Patented Nov. 9, 1937

2,098,541

UNITED STATES PATENT OFFICE 2,098,541

MOISTUREPROOF ARTICLE

William Hale Charch, Buffalo, N. Y., and Merlin Martin Brubaker and Frederick M. Meigs, Wilmington, Del., assignors, by mesne assignments, to E. I. du Pont de Nemours & Company, Wilmington, Del., a corporation of Delaware No Drawing. Application December 21, 1934, Serial No. 758,660

22 Claims. (Cl. 91—68)

This invention relates to the art of moistureproofing. More particularly, it relates to a composition of matter suitable for the production of moistureproof materials and also to the moistureproof materials per se.

We believe that moistureproofing is due to (1) the use of an agent which is inherently moistureproof, and (2) the laying down of this agent in a continuous unbroken film, either alone or in combination with other materials or vehicles hereinafter called film-forming substances.

We have found, as a result of a large number of experiments, that substances are inherently moistureproof when they are of such a nature that they are not only insoluble in water but also dissolve none or at least only an infinitesimal amount of water. Apparently, water vapor diffuses through continuous unbroken films of such substances by a process of dissolving in the film and evaporating from the other side. The solubility of water in the moistureproofing agent largely determines the rate of transfusion of water vapor through the film, and therefore its inherent moistureproofness. Obviously, if the film is non-continuous and broken, other factors enter into the determination of the degree of moistureproofness.

We have found that organic-metallic compounds of the type hereafter more fully described can be used in the preparation of moistureproofing compositions which will yield moistureproof films, i. e., coatings or self-sustaining films which are preferably also transparent, glossy, non-tacky, flexible, possess good surface slip, etc.

For the purposes of this specification and claims, we define moistureproof materials as those which, in the form of continuous unbroken sheets or films, permit the passage of not more than 570 grams of water vapor per 100 square meters per hour, over a period of 24 hours, at approximately 35° C. ± 0.2° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purpose of experimental tests, especially for those materials adaptable as coating compositions, moistureproof materials include those substances, compounds or compositions which, when laid down in the form of a continuous unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 570 grams of water vapor per 100 square meters per hour over a period of approximately 24 hours, at a temperature of 35° C. ± 0.2° C., with a water vapor pressure differential of 40–44 mm. (preferably 41.8 ± 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 5700.

From the foregoing, it is apparent that under the conditions set forth, a moistureproofed regenerated cellulose sheet is capable of resisting the passage of moisture or water vapor therethrough at least 10 times as effectively as the uncoated regenerated cellulose sheet.

We have specifically defined herein moistureproofness in terms of a permeability test performed at substantially 35° C. It is to be understood, however, that by the adoption of this condition no disclaimer is made of moistureproofness of any of the materials or compositions when tested at temperatures lower than 35° C. Likewise, no disclaimer is made of moistureproofing effects exhibited by the materials herein described at temperatures above 35° C. There will be a temperature for each moistureproofing agent above which neither it nor compositions containing it show substantial resistance to the passage of moisture. However, this behavior does not disqualify the materials herein described as moistureproofing agents.

The critical temperature above which these agents no longer exhibit moistureproof properties is dependent primarily upon the melting point of the material and upon the nature and composition of the film-forming substance with which it is used. Agents of higher melting points will show moistureproof properties up to higher temperatures than will agents of low melting points, other conditions being equal. Generally speaking, the agents of higher melting points will be preferred for this reason, though for certain other purposes it may be definitely advisable to use agents of lower melting points.

It is, therefore, an object of this invention to provide a composition of matter suitable for casting or coating purposes comprising a film-forming substance and an organic-metallic compound, more fully described hereafter, which will deposit a moistureproof film, i. e., a self-sustaining film or coating which is preferably also transparent, flexible, non-tacky, glossy, and possesses good surface slip.

Another object of this invention is to provide moistureproof films, i. e., self-sustaining films or coatings containing organic-metallic compounds which impart moistureproofness thereto, said films being also preferably transparent, flexible, non-tacky, glossy and possessing good surface slip.

Other objects will become apparent from the following description and appended claims.

The instant invention, in one phase thereof, contemplates a flowable composition of matter which will deposit a moistureproof film, i. e., self-sustaining film or coating which, in the preferred embodiment, is transparent (glass-clear), flexible, glossy, non-tacky, and possesses good surface slip. The composition consists of an agent which affords the basis for moistureproofness, and a film-forming substance. In the preferred embodiment, the composition also includes a solvent or solvent mixture, a plasticizer and/or a blending agent.

As the agents which afford the basis for the moistureproofness, the instant invention contemplates organic-metallic compounds which are inherently moistureproof and have a melting point of at least 37° C. The molecule of the moistureproof organic-metallic compound is largely hydrocarbon carbon, but may contain the usual modifying groups, such as hydroxyl, carbonyl, halogen, ester, etc., providing it has a sufficiently high hydrocarbon carbon content to offset the affinity for water for these substituent groups. In so far as this specification is concerned, a hydrocarbon carbon atom is one which has at least three of its valences attached to carbon or hydrogen.

When an organic-metallic compound containing no modifying group in the molecule is used as a moistureproofing agent, we have found that the molecule must contain at least 8 hydrocarbon carbon atoms per valence of the metallic ingredient in order to achieve a moistureproofing effect. When more than the number of hydrocarbon carbon atoms previously mentioned are present, better moistureproofing effects are secured.

The organic-metallic compounds contemplated by this invention may be aliphatic, cyclic, aromatic, or mixed or substituted organic-metallic compounds containing additional active or modifying groups. Any group or atom other than hydrocarbon is considered an active group. We have found that when the number of active groups is increased the limiting ratio of hydrocarbon carbon atoms to the active group is decreased. For example, when two similar active groups are present, the limiting ratio may be 55%–66% of the limiting ratio for one such group, while for three similar active groups the limiting ratio is 45%–55% and approaches a limiting value of 30% as the number of similar active groups is further increased. When different active groups are introduced, the limiting ratio of hydrocarbon carbon atoms will vary depending upon the nature and number of such groups. Thus, for example, if two different active groups are present, the limiting ratio of hydrocarbon carbon atoms to active groups will be 55%–66% of the mean of the limiting ratio for each of the individual active groups.

Organic-metallic compounds containing halogen or hydroxyl or the like attached to the metal are not moistureproof as these compounds behave like inorganic salts and alkalies and have too great an affinity for water. Furthermore, compounds which are unstable in air, such as organic zinc and magnesium compounds, are not suitable for our purposes. In addition, certain organic-metallic compounds which are inherently moistureproof present practical difficulties in the preparation of the continuous unbroken film, either due to low solubility or to extremely high melting points. Tetraphenyl lead is an example of this type of organic-metallic compounds. It is relatively insoluble and has a melting point of 125° C. Its low solubility in the usual lacquer components makes the preparation of films containing much of this compound difficult, and, in addition, its strong tendency to crystallize causes its separation from these films and thus destroys the continuity of the film.

As is apparent from the foregoing description, in the organic metallic compounds contemplated by this invention the valences of the metallic portion of the compound are all satisfied by hydrocarbon carbon atoms.

Di-octadecyl mercury, tetra-dodecyl tin, tetracetyl lead, diceryl mercury and the like are specific illustrative examples of organic-metallic compounds which are moistureproof and can be utilized in the preparation of moistureproof films.

As previously mentioned, the composition also contains a film-forming substance. As illustrative examples of film-forming substances may be mentioned cellulose derivatives, for example, cellulose nitrate, cellulose acetate, ethyl cellulose, benzyl cellulose, mixed esters or ether esters; resins, either natural or synthetic, such as rosin, hydrogenated rosin and its derivatives, including glycerol, glycol or diethylene glycol esters of hydrogenated rosin; rosin esters of glycerol, glycol or diethylene glycol; gum dammar; polybasic acid-polyhydric alcohol resins, either modified or unmodified; vinyl resins of the polymerized vinyl acetate, polymerized chlor-vinyl acetate and polymerized vinyl acetal resin types; metastyrene resin; phenolic condensation products; rubber, gutta percha, balata, caoutchouc; synthetic rubbers including polymers of isoprene, butadiene and their homologues; chemical derivatives of rubber, such as halogenated rubber, rubber treated with sulphuric acid, rubber treated with tin tetrachloride; rubber treated with chlorostannic acid; varnishes; etc. One or a plurality of film-forming ingredients may be used. The precise film-forming ingredient or mixture thereof depends upon the purpose for which the compositions are to be used.

When the composition contains a softener, any suitable softener for the film-forming ingredient may be used. For example, diamyl phthalate, tricresyl phosphate, dicyclohexyl phthalate, butyl benzoyl benzoate, etc. may be used, when the film-forming ingredient is a cellulose derivative.

In some compositions wherein a cellulose derivative is used, the film which is produced may be hazy. If desired, this may be overcome by incorporating in such a composition a blending agent. Such compositions also are generally more moistureproof than those without the blending agent or gum. The blending agent tends to improve the compatibility of the moistureproofing agents with the other ingredients in the film and consequently the impermeability of the film. As several illustrative examples of blending agents may be mentioned gums or resins, such as dammar, gum elemi, ester gum, hydrogenated rosin; hydrogenated ester gum or the like, halogenated diphenyl, a natural occurring balsam or a synthetic balsam-like substance, such as diethylene glycol hydrorosinate, or a substance such as lanum, hydrogenated castor oil, di-dodecyl phthalate, retene, diricinoleic ester of glycerol or the like.

The ingredients which constitute the final film may be dissolved in an appropriate solvent or solvent mixture to form a solution which may be used as herein described. Alternatively, the ingredients constituting the final film may be used in the form of a melt. When the composition is to be used in the form of a melt, it is desirable to include therein a blending agent to inhibit crystallization. Hydrogenated rubber, hydrogenated ester gum, rosin, dammar, diethylene glycol hydrorosinate and the like, are several illustrative examples of crystallization inhibitors. Whenever the composition is in the form of a lacquer and used for coating purposes, the solvents thereof are chosen so that they will not produce any deleterious effects on the base being coated.

The proper formulation of the lacquer so that it will yield coatings which are transparent and highly moistureproof is determined by tests. One of the most important things to be determined is the proper amount of blending agent to be used. This can be determined, for example, as follows: A series of compositions is prepared containing the same amounts of lacquer base, softener, moistureproofing agent and solvent. Different quantities of blending agent are then added to each of these lacquers and the general properties, such as transparency and the permeability values of sheets of regenerated cellulose, for example, coated with each of these compositions, are plotted against the ratio of blending agent to moistureproofing agent used.

When a lacquer of the type described in Example III is modified according to this systematic procedure, it will be found that the lowest permeability value occurs very near the point where the coatings become completely transparent. In the case of di-octadecyl mercury in this particular composition, this point is equivalent to approximately 3.25 to 6 grams of dammar to 1 gram of di-octadecyl mercury. It is obvious that this optimum blending agent-moistureproofing agent ratio will vary for different moistureproofing agents and for different blending agents with the same moistureproofing agent. In general, this ratio depends upon the hydrocarbon carbon content and the solubility of the moistureproofing agent in the lacquer solids. Thus, the ratio is high for moistureproofing agents having high hydrocarbon carbon content and low for moistureproofing agents which are quite soluble or compatible with the other constituents of the coating. Undoubtedly, other factors, such as melting point, solvent composition of the lacquer, type of lacquer base used, choice of plasticizer, etc., also affect this optimum ratio, but the two considerations mentioned above seem to be the more important ones.

A series of experiments, based on the composition of Example III will, of course, have a pyroxylin lacquer base and a pyroxylin-moistureproofing agent ratio of 5.26:1. Obviously, this ratio can also be varied and the relations between permeability value and the blending agent-moistureproofing agent ratio determined for sheets of regenerated cellulose coated with a series of lacquers having a different lacquer base-moistureproofing agent ratio to which various amounts of dammar or other blending agent have been added. These relations will have the same general character but it will be found generally that, as the lacquer base-moistureproofing agent ratio is increased (decreasing the quantity of moistureproofing agent), the permeability values will be higher for a given blending agent-moistureproofing agent ratio and will eventually pass out of the moistureproof limit. On the other hand, decreasing this ratio (increasing the moistureproofing agent) does not decrease the permeability values indefinitely and, after a certain point is reached, may even decrease the moistureproofness. Experiments have shown that the optimum lacquer base-moistureproofing agent ratio usually falls within the limits 1:10 to 200:1 and the blending agent-moistureproofing agent ratio lies between the limits of 0:1 to 10:1. The most satisfactory cellulose derivative base-moistureproofing lacquers generally fall within these limits for nearly all moistureproofing agents, the optimum pyroxylin-moistureproofing agent ratios being of the order of 2:1 to 30:1. However, for certain purposes, for example, compositions for casting moistureproof foil, the ratios may differ greatly from those given above and we do not intend that we should be confined to these limits which are suggested merely as an aid to the proper formulation of moistureproofing lacquers.

The above or any other method for determining the most satisfactory formula in which to use any moistureproofing agent to achieve minimum permeability and maximum clarity of coating may be used. The above discussion is merely given as one systematic method, whereby compositions may be formulated with the moistureproofing agents here disclosed. Different moistureproofing agents will yield different data on such a series of experiments as this, and moistureproofing agents of different chemical constitution will be formulated differently into various dopes or vehicles. There is thus no single composition such as has been described above which is capable of universal application. The specific examples hereinafter given are thus illustrative, and the above-described method of systematically varying the compositions of solids in which a moistureproofing agent is used is exemplary of a general method, whereby optimum results may be achieved with an agent. The method is, of course, capable of extension to include variations of any of the solid lacquer ingredients, or even to include solvents and the solvent composition. Thus, when one skilled in the art is taught by these disclosures, he will be able to formulate a variety of compositions containing any of the moistureproofing agents or to determine those compositions with which our moistureproofing agents are most advantageously used. A moistureproofing agent is thus not a material which will always and universally produce moistureproof coatings utterly regardless of the composition in which it is used. It usually requires to be formulated in certain favorable compositions to bring out its inherent moistureproofing properties. On the other hand, a substance which is not inherently moistureproof cannot by any extended amount of work in formulation be made to yield moistureproof films or coatings. Thus, when we speak of the inherent property of a compound to moistureproof, we are concerned with a specific inherent property which permits it to be used with some film-forming vehicle to produce moistureproof coatings.

The composition can be used for the production of films, either by casting it in the well-known manner to produce self-sustaining films, or by coating it on to the selected base. When the composition is to be used as a coating, any suitable base material, paper, highly calendered paper, glassine, leather, fabrics, etc. may be used. The compositions may even be applied to metals to prevent them from rust by virtue of their moistureproofing property. They may also be used to coat individual fibers of cotton, wool or artificial silk in such a manner as to make them moisture-proof. In the preferred embodiment of the invention, when a transparent wrapping tissue is desired, the base may consist of thin, dense, non-fibrous, substantially non-porous and preferably transparent sheeting formed of a cellulosic, albuminous or other material. As illustrative examples of cellulosic sheeting may be mentioned cellulosic sheeting coagulated or precipitated from an aqueous dispersion or solution of a cellulosic material, for example, sheeting of regenerated cellulose, glycol cellulose, cellulose glycollic acid, lowly etherified or esterified cellulose, such as lowly methylated cellulose; and sheeting of cellulose derivatives, such as cellulose acetate, cellulose nitrate, ethyl cellulose, benzyl cellulose. Gelatin and casein, hardened or not as desired, are mentioned as illustrative examples of albuminous materials. Sheeting of rubber or rubber derivatives may also be used as the base.

When a selected base, as for example regenerated cellulose sheet, is to be moistureproofed by the compositions hereinbefore described, the composition is applied to the regenerated cellulose sheeting in any suitable manner, such as immersion, spraying, brushing, etc. The lacquer may be, if necessary, maintained at the time of application at an elevated temperature in order to prevent separation of the moistureproofing ingredients. The excess composition is removed by any suitable means and substantially all the volatile solvents are removed from the composition at an elevated temperature, for example, 90° C.–110° C., in order to prevent separation or crystallization of the moistureproofing agent during evaporation of the solvent. It is also preferable to use air low in moisture content during the drying operation in order to obtain evaporation of the solvent without film blush. After being dried, the product, if the base is of the type which loses moisture at elevated temperatures, may be subjected to a humidifying treatment or other means for a sufficient time to impart or restore flexibility and to deodorize. In some cases, the lacquer-coated materials may be air-dried at room temperature, in which case the humidifying treatment is not needed.

Hereafter, there are set forth several illustrative specific examples in order to more clearly explain the invention:

Example I (A) A composition consisting of the following ingredients in approximately the proportions set forth is prepared in any convenient and appropriate manner:

| | Parts by weight |
|---|---|
| Pyroxylin | 5.26 |
| Gum dammar | 4.50 |
| Dibutyl phthalate | 2.32 |
| Di-octadecyl mercury | 1.00 |
| Ethyl acetate | 46.25 |
| Toluene | 36.00 |
| Alcohol | 6.28 |
| Acetone | 0.68 |

A transparent sheet of regenerated cellulose is submerged in this lacquer which, for convenience, is maintained at a temperature of 40° C. in order to prevent separation of the moistureproofing agent. The excess lacquer is removed by suitable means and the coated sheet is dried, preferably promptly, at an elevated temperature and, preferably also, in air at 90° C.–110° C. The coated sheet is glass-clear in transparency, flexible, non-tacky, glossy, possesses good surface slip and is only approximately 0.00005″ to 0.00015″ thicker than the uncoated sheet and it is practically impossible to distinguish the coated sheet from the uncoated sheet in appearance. However, the coated sheet is moistureproof, having a permeability value of less than 570, for example, of the order of 57 or even less.

The coated sheet is much more resistant to the passage of water vapor than a similar sheet coated with the same lacquer except for the omission of di-octadecyl mercury or a sheet coated, for example, with a high grade waterproof spar varnish. A sheet coated with the lacquer without the addition of di-octadecyl mercury will have a permeability value of 4,000 to 5,000, while the sheet coated with a waterproof spar varnish will have a permeability value of from 2,000 to 4,000.

(B) Di-octadecyl mercury in Example I(A) above is substituted by an equal amount of tetracetyl lead. The process of Example I(A) is utilized for coating regenerated cellulose sheeting. The product possesses the same characteristics as the product of Example I(A) except that the product produced by the instant example has a permeability value of not more than 570.

Example II

A composition consisting of the following ingredients in approximately the proportions set forth is prepared by any well-known procedure:

| | Parts by weight |
|---|---|
| Ethyl cellulose | 6.0 |
| Rosin | 4.0 |
| Tricresyl phosphate | 1.0 |
| Dicetyl mercury | 1.0 |
| Toluene | 60.0 |
| Alcohol | 19.0 |

This composition is suitable for coating transparent sheets of cellulose acetate, and such coated sheets will have a permeability value of the order of 285 or less. This product is also transparent, flexible, glossy and possesses good surface slip.

The above composition becomes useful for air-dried coatings if 10 parts by weight of ethyl lactate is added thereto to avoid blushing. Coatings of this composition can be air-dried at room temperature for an hour or so. An air-dried product will have a permeability value of not over 570.

As previously explained, in many cases it may be desirable to omit the gum or resin entirely, though when used it may materially improve the transparency of the final product.

The following is an example of moistureproofing compositions containing no gum or resin:

Example III

A composition consisting of the following ingredients in approximately the proportions set forth is prepared in any well-known manner:

| | Parts by weight |
|---|---|
| Pyroxylin | 5.26 |
| Dibutyl phthalate | 2.32 |
| Di-octadecyl mercury | 1.00 |
| Ethyl acetate | 46.25 |
| Toluene | 36.00 |
| Alcohol | 6.28 |
| Acetone | 0.68 |

A highly calendered, smooth paper is provided with a continuous layer of this composition, with or without impregnation, and then dried at 90° C.–110° C. The product has a permeability value of the order of 380 or less.

The composition described in Example III yields a coating which may be slightly hazy. If transparency is essential, a blending agent of the type previously mentioned may be incorporated in this composition. Thus, for example, the lacquer described in Example III may be so modified that it will always yield a transparent coating by the addition of a blending agent, such as dammar. The quantity of dammar or other blending agent to be added must be determined as previously described.

The following is an example of a composition wherein a polybasic acid-polyhydric alcohol resin constitutes the film-forming ingredient. This composition, consisting of the following ingredients in approximately the proportions given, is prepared in any suitable manner:

| | Parts by weight |
|---|---|
| *Perilla oil-polybasic acid-polyhydric alcohol resin varnish | 50.0 |
| Diceryl mercury | 1.0 |
| Toluene | 50.0 |

*The perilla oil polybasic acid-polyhydric alcohol resin varnish is prepared from the following ingredients:

| | Parts by weight |
|---|---|
| Perilla oil | 329.0 |
| Phthalic anhydride | 472.5 |
| Glycerin | 204.6 |
| Sodium hydroxide | 0.7 |
| Metallic cobalt (added as linoleate) | 0.7 |
| Ethyl acetate | 800.0 |

*The procedure for preparing the perilla oil polybasic acid-polyhydric alcohol resin varnish is as follows: Heat 72.6 parts of C. P. glycerin to 350° F. in closed kettle-condenser and stirrer. At 350° F. add NaOH, followed by perilla oil. Stir rapidly and heat to 437° F. Hold until clear (15–30 minutes). Add phthalic anhydride and heat to 392° F. Add residue of glycerin to batch. Heat to 392° F. and hold (5 hours). Acid number 45–55. Cool to 175° F. Cut with ethyl acetate. Add drier and centrifuge (solids 50%).

Regenerated cellulose sheeting coated with this composition, as explained under Example I(A), and dried at room temperature, or at 90° C.–110° C., produces a product having a permeability value of the order of 570 or less. A composition of this type may be used without blending agents, but in some cases it is advantageous to use a small amount of gum. Usually, compositions of this nature are sufficiently flexible without the addition of a plasticizer. Lacquers of this type may be used when particularly good adhesion is desired.

As previously explained, another method of obtaining articles which are of themselves moistureproof is the casting of films containing the organic polyethers as moistureproofing agents. The compositions given in Examples I to III inclusive may be used for this purpose. It is usually desirable, however, to employ a higher solids base solution for casting sheets than is ordinarily used for forming thin coatings. Furtherfore, in view of the greater thickness of cast foils as compared to coatings, a smaller proportion of the moistureproofing agent is used in order to obtain transparency and a high degree of moistureproofness, and this in turn will require the use of a smaller quantity of blending agent and/or the use of blending agents other than hard gums in appreciable quantities. Those skilled in the art will be able to formulate by tests satisfactory compositions for the preparation of cast sheets.

The cast sheets and protective coatings prepared in accordance with the instant invention have the ability to resist the transmission or diffusion of water vapor to an extent at least 4 times that displayed by sheets of equal thickness and produced from similar or prior art compositions formulated without the addition of moistureproofing agents. The value "4" merely sets forth the minimum improvement and does not limit the higher moistureproofness that can be obtained. The moistureproofing agents herein described are capable of being formulated into films showing improvement over prior art films produced from compositions formulated without the addition of moistureproofing agents not only 4 but 10, 20, 40 and in some cases even 100 fold. This is truly a remarkable accomplishment.

The compounds described in this application as moistureproofing agents have many advantages. Moistureproofing compositions containing the moistureproofing agents are easily duplicated. As previously stated, these compositions in certain formulations thereof yield coatings which air-dry at ordinary temperatures. For certain purposes where it is not feasible to force-dry the coatings, this becomes especially important. As for the moistureproofing agents themselves, they are generally colorless, odorless, tasteless, non-volatile, and essentially non-toxic, at least in the quantities in which they are used, and they can be reproduced synthetically with a high degree of uniformity and consistency.

In the definition hereinbefore set forth, it is to be understood that the permeability value of 570 represents only the maximum value. In many cases, permeabilities of 235, 140, 57, 30 or indeed less may be obtained.

When bases of the preferred type are utilized, the ultimate product is admirably suited for use as a transparent, moistureproof wrapping tissue.

Since it is obvious that various changes and modifications may be made in the above description without departing from the nature or spirit thereof, this invention is not restricted thereto except as set forth in the appended claims.

We claim:

1. An article of manufacture comprising a base having a continuous coating comprising a film-forming substance and an organic-metallic compound in which the valences of the metallic portion of the compound are all satisfied by hydrocarbon carbon atoms and having a melting point of at least 37° C. as the moistureproofing agent, the organic-metallic compound being present in an amount to impart moistureproofness to the product produced from said composition.

2. An article of manufacture comprising a transparent, non-fibrous base sheet having a transparent continuous coating comprising a film-forming substance, a blending agent and an organic-metallic compound in which the valences of the metallic portion of the compound are all satisfied by hydrocarbon carbon atoms and having a melting point of at least 37° C. as the moistureproofing agent, the organic-metallic compound being present in an amount to impart moistureproofness to the product produced from said composition.

3. An article of manufacture comprising a regenerated cellulose base sheet having a transparent continuous coating comprising a film-forming substance, a blending agent and an organic-metallic compound in which the valences of the metallic portion of the compound are all satisfied by hydrocarbon carbon atoms and having a melting point of at least 37° C. as the moistureproofing agent, the organic-metallic compound being present in an amount to impart moistureproofness to the product produced from said composition.

4. An article of manufacture comprising a base having a continuous coating comprising a film-forming substance and an organic-metallic compound in which the valences of the metallic portion of the compound are all satisfied by hydrocarbon carbon atoms and having a melting point of at least 37° C., containing no modifying groups in the molecule and at least 8 hydrocarbon carbon atoms per valence of the metallic atom as the moistureproofing agent, the organic-metallic compound being present in an amount to impart moistureproofness to the product produced from said composition.

5. An article of manufacture comprising a transparent non-fibrous base sheet having a transparent continuous coating comprising a film-forming substance, a blending agent and an organic-metallic compound in which the valences of the metallic portion of the compound are all satisfied by hydrocarbon carbon atoms and having a melting point of at least 37° C., containing no modifying groups in the molecule and at least 8 hydrocarbon carbon atoms per valence of the metallic atom as the moistureproofing agent, the organic-metallic compound being present in an amount to impart moistureproofness to the product produced from said composition.

6. An article of manufacture comprising a transparent regenerated cellulose base sheet having a transparent continuous coating comprising a film-forming substance, a blending agent and an organic-metallic compound in which the valences of the metallic portion of the compound are all satisfied by hydrocarbon carbon atoms and having a melting point of at least 37° C., containing no modifying groups in the molecule and at least 8 hydrocarbon carbon atoms per valence of the metallic atom as the moistureproofing agent, the organic-metallic compound being present in an amount to impart moistureproofness to the product produced from said composition.

7. An article of manufacture having a continuous unbroken moistureproof surface comprising a film-forming substance and an organic metallic compound in which the valences of the metallic portion of the molecule are all satisfied by hydrocarbon carbon atoms as the moistureproofing agent, said organic metallic compound having a melting point of at least 37° C. and being present in an amount to impart moistureproofness to said article.

8. An article of manufacture comprising a continuous unbroken moistureproof film comprising a film-forming substance and an organic metallic compound in which the valences of the metallic portion of the molecule are all satisfied by hydrocarbon carbon atoms as the moistureproofing agent, said organic metallic compound having a melting point of at least 37° C. and being present in an amount to impart moistureproofness to said film.

9. An article of manufacture having a continuous unbroken moistureproof surface comprising a film-forming substance and an organic metallic compound in which the valences of the metallic portion of the molecule are all satisfied by hydrocarbon carbon atoms as the moistureproofing agent, said organic metallic compound having a melting point of at least 37° C., containing no modifying groups in the molecule, having at least 8 hydrocarbon carbon atoms per valence of the metallic atom, and being present in an amount to impart moistureproofness to said article.

10. An article of manufacture comprising a continuous unbroken moistureproof film comprising a film-forming substance and an organic metallic compound in which the valences of the metallic portion of the molecule are all satisfied by hydrocarbon carbon atoms as the moistureproofing agent, said organic metallic compound having a melting point of at least 37° C., containing no modifying groups in the molecule, having at least 8 hydrocarbon carbon atoms per valence of the metallic atom, and being present in an amount to impart moistureproofness to said film.

11. An article of manufacture having a continuous unbroken moistureproof surface comprising a film-forming substance and an organic metallic compound in which the valences of the metallic portion of the molecules are all satisfied by hydrocarbon carbon atoms as the moistureproofing agent and a blending agent, said organic metallic compound having a melting point of at least 37° C., containing no modifying groups in the molecule, having at least 8 hydrocarbon carbon atoms per valence of the metallic atom, the ratio of the quantity of film-forming substance to the quantity of organic metallic compound being within the limits of 1:10 to 200:1 and the ratio of the quantity of blending agent to the quantity of organic metallic compound being within the limits of 0:1 to 10:1.

12. An article of manufacture comprising a continuous unbroken film comprising pyroxylin and an organic metallic compound in which the valences of the metallic portion of the molecule are all satisfied by hydrocarbon carbon atoms as the moistureproofing agent and a blending agent, said organic metallic compound having a melting point of at least 37° C., containing no modifying groups in the molecule and having at least 8 hydrocarbon carbon atoms per valence of metallic atom, the ratio of the quantity of pyroxylin to the quantity of organic metallic compound being within the limits of 2:1 to 30:1.

13. An article of manufacture having a continuous unbroken moistureproof surface comprising a film-forming substance and di-octadecyl mercury as the moistureproofing agent, the di-octadecyl mercury being present in amount to impart moistureproofness to the article.

14. An article of manufacture having a continuous unbroken moistureproof surface comprising a film-forming substance and tetracetyl lead as the moistureproofing agent, the tetracetyl lead being present in amount to impart moistureproofness to the article.

15. An article of manufacture having a continuous unbroken moistureproof surface comprising a film-forming substance and diceryl mercury as the moistureproofing agent, the diceryl mercury being present in amount to impart moistureproofness to the article.

16. An article of manufacture comprising a transparent non-fibrous base sheet or film having a transparent continuous moistureproof coating on each side thereof comprising a film-forming substance and di-octadecyl mercury as the moistureproofing agent, the latter being present in an amount to impart moistureproofness to said coating.

17. An article of manufacture comprising a transparent non-fibrous base sheet or film having a transparent continuous moistureproof coating on each side thereof comprising a film-forming substance and tetracetyl lead as the moistureproofing agent, the latter being present in an amount to impart moistureproofness to said coating.

18. An article of manufacture comprising a transparent non-fibrous base sheet or film having a transparent continuous moistureproof coating on each side thereof comprising a film-forming substance and diceryl mercury as the moistureproofing agent, the latter being present in an amount to impart moistureproofness to said coating.

19. An article of manufacture having a continuous unbroken moistureproof surface comprising a film-forming substance and an organic metallic compound in which the valences of the metallic portion of the molecule are all satisfied by hydrocarbon carbon atoms as the moistureproofing agent, said organic metallic compound having a melting point of at least 37° C., containing no modifying groups in the molecule and selected from the group which consists of organic metallic compounds containing (1) one metallic atom and at least 8 hydrocarbon carbon atoms per valence of the metallic atom, (2) two metallic atoms and at least approximately 4 hydrocarbon carbon atoms per valence of each metallic atom, (3) three metallic atoms and at least approximately 3 hydrocarbon carbon atoms per valence of each metallic atom, and (4) more than three metallic atoms and at least approximately 2 hydrocarbon carbon atoms per valence of each metallic atom, said organic metallic compound being present in an amount to impart moistureproofness to said article.

20. An article of manufacture having a continuous unbroken moistureproof film comprising a film-forming substance and an organic metallic compound in which the valences of the metallic portion of the molecule are all satisfied by hydrocarbon carbon atoms as the moistureproofing agent, said organic metallic compound having a melting point of at least 37° C., containing no modifying groups in the molecule and selected from the group which consists of organic metallic compounds containing (1) one metallic atom and at least 8 hydrocarbon carbon atoms per valence of the metallic atom, (2) two metallic atoms and at least approximately 4 hydrocarbon carbon atoms per valence of each metallic atom, (3) three metallic atoms and at least approximately 3 hydrocarbon carbon atoms per valence of each metallic atom, and (4) more than three metallic atoms and at least approximately 2 hydrocarbon carbon atoms per valence of each metallic atom, said organic metallic compound being present in an amount to impart moistureproofness to said article.

21. An article of manufacture comprising a base having a continuous unbroken moistureproof coating comprising a film-forming substance and an organic metallic compound in which the valences of the metallic portion of the molecule are all satisfied by hydrocarbon carbon atoms as the moistureproofing agent, said organic metallic compound having a melting point of at least 37° C., containing no modifying groups in the molecule and selected from the group which consists of organic metallic compounds containing (1) one metallic atom and at least 8 hydrocarbon carbon atoms per valence of the metallic atom, (2) two metallic atoms and at least approximately 4 hydrocarbon carbon atoms per valence of each metallic atom, (3) three metallic atoms and at least approximately 3 hydrocarbon carbon atoms per valence of each metallic atom, and (4) more than three metallic atoms and at least approximately 2 hydrocarbon carbon atoms per valence of each metallic atom, said organic metallic compound being present in an amount to impart moistureproofness to said article.

22. An article of manufacture comprising a transparent base sheet or film having a continuous unbroken transparent moistureproof coating on each side thereof comprising a film-forming substance and an organic metallic compound in which the valences of the metallic portion of the molecule are all satisfied by hydrocarbon carbon atoms as the moistureproofing agent and a blending agent, said organic metallic compound having a melting point of at least 37° C., containing no modifying groups in the molecule and selected from the group which consists of organic metallic compounds containing (1) one metallic atom and at least 8 hydrocarbon carbon atoms per valence of the metallic atom, (2) two metallic atoms and at least approximately 4 hydrocarbon carbon atoms per valence of each metallic atom, (3) three metallic atoms and at least approximately 3 hydrocarbon carbon atoms per valence of each metallic atom, and (4) more than three metallic atoms and at least approximately 2 hydrocarbon carbon atoms per valence of each metallic atom, said organic metallic compound being present in an amount to impart moistureproofness to said article.

WILLIAM HALE CHARCH.
MERLIN MARTIN BRUBAKER.
FREDERICK M. MEIGS.